July 20, 1943.　　　　S. GOLD　　　　2,324,833
EDUCATIONAL AIRPLANE COCKPIT OUTFIT
Filed Oct. 30, 1942　　　6 Sheets-Sheet 1

INVENTOR
Sam Gold
BY
Gluck & Kreitenfeld
ATTORNEYS

July 20, 1943.　　　　　S. GOLD　　　　　2,324,833
EDUCATIONAL AIRPLANE COCKPIT OUTFIT
Filed Oct. 30, 1942　　　6 Sheets-Sheet 2
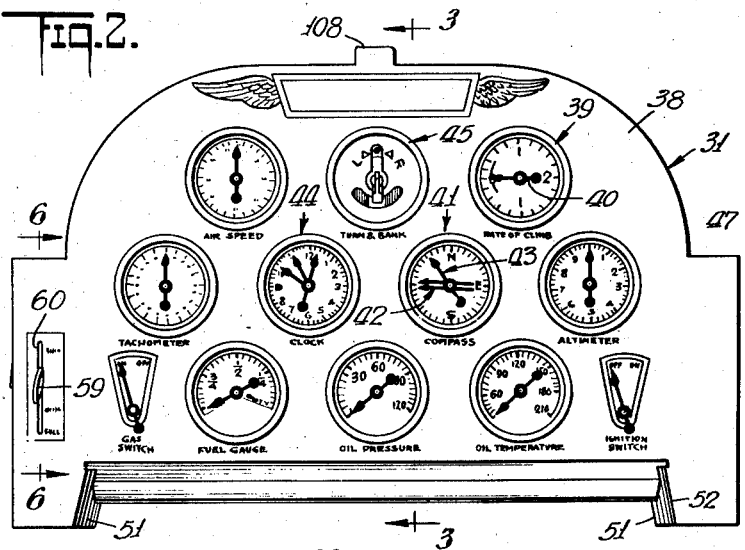
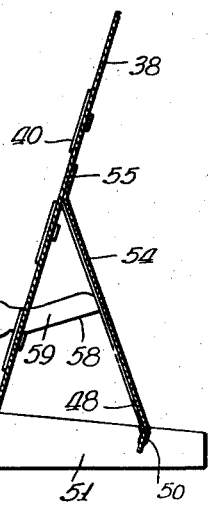
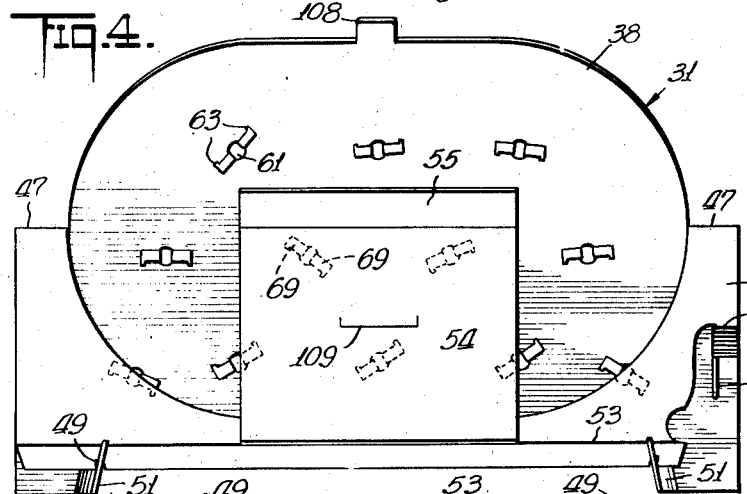
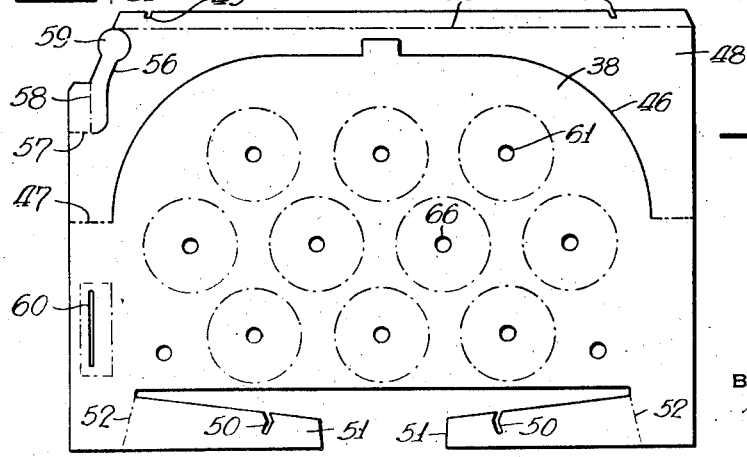
INVENTOR
*Sam Gold*
BY
ATTORNEYS

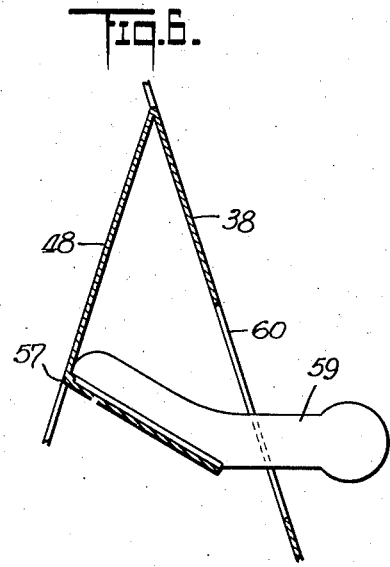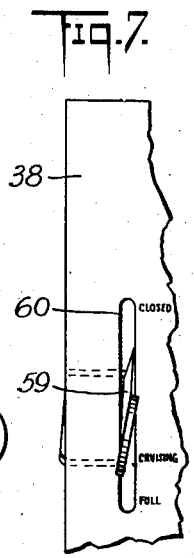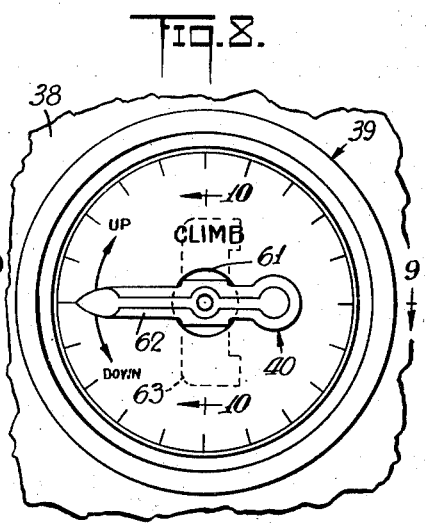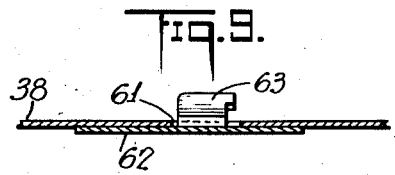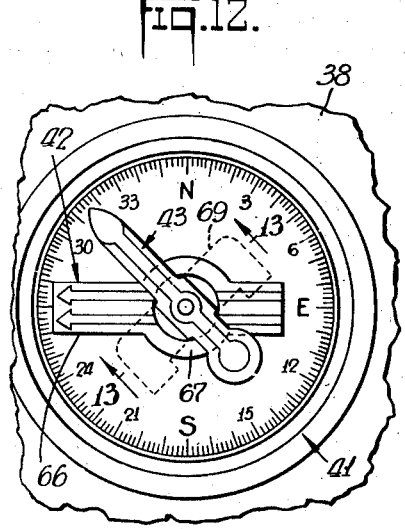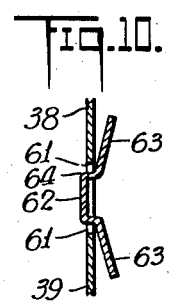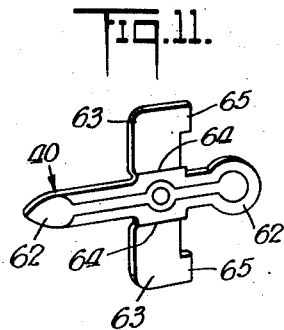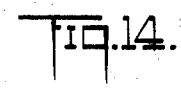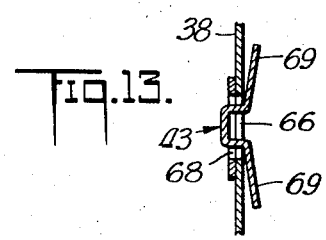

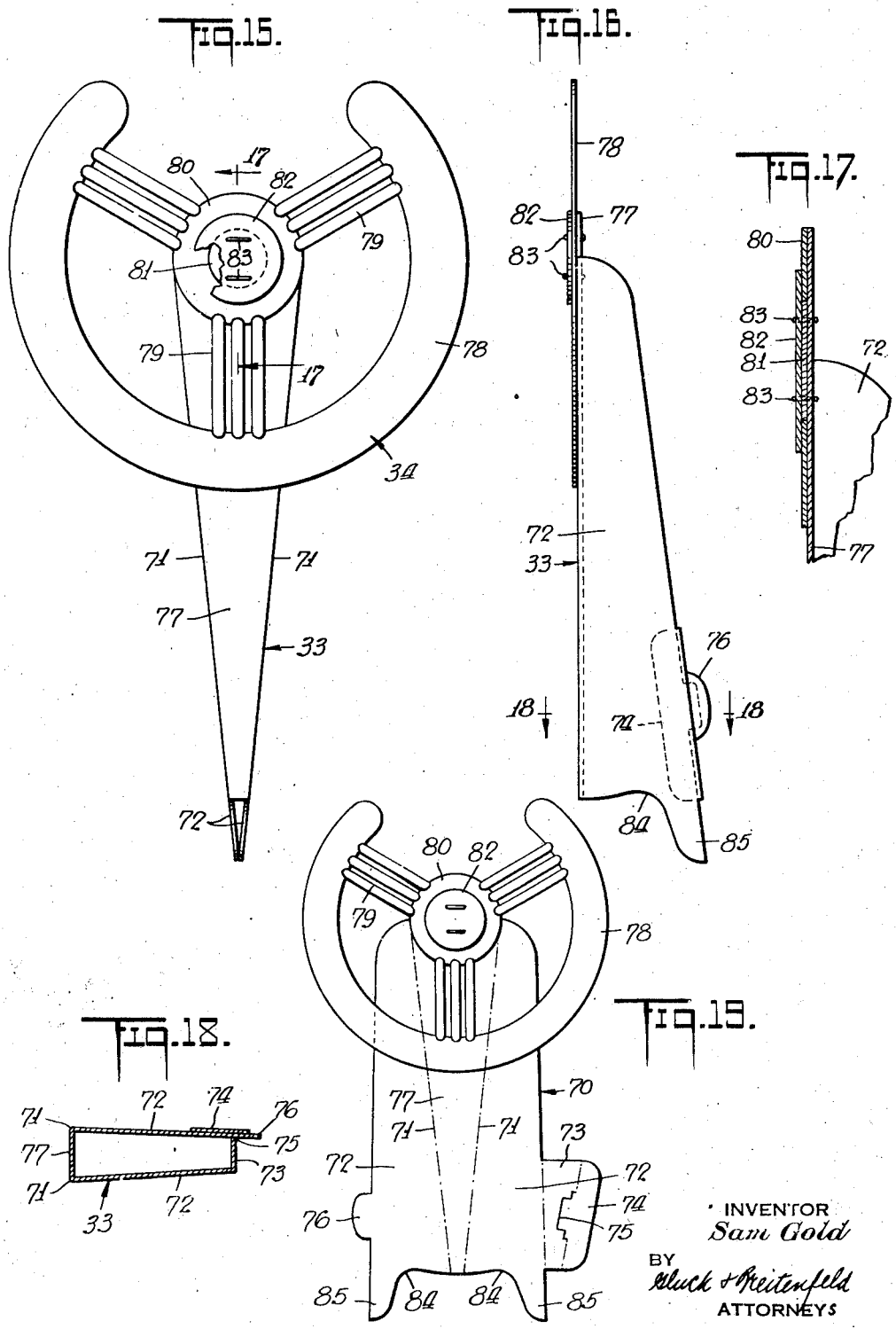

July 20, 1943.  S. GOLD  2,324,833
EDUCATIONAL AIRPLANE COCKPIT OUTFIT
Filed Oct. 30, 1942  6 Sheets-Sheet 5
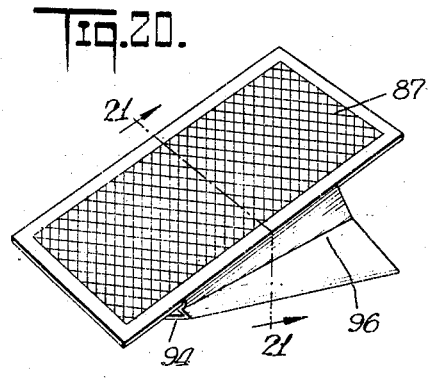
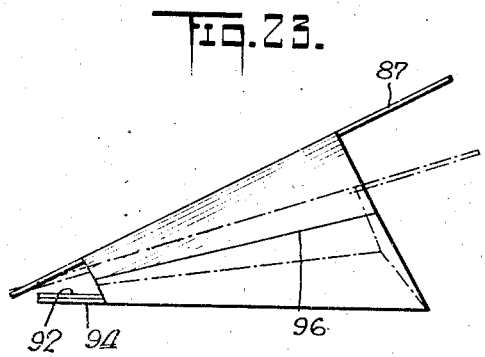
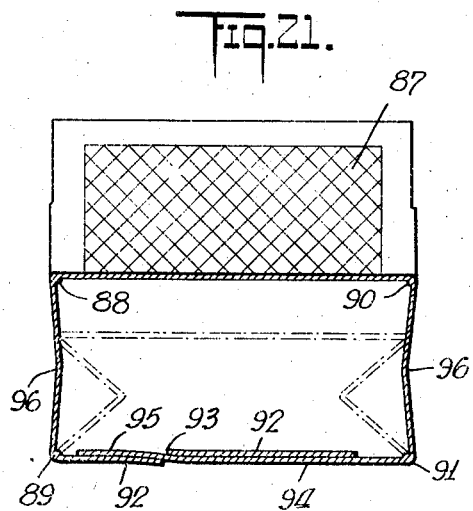
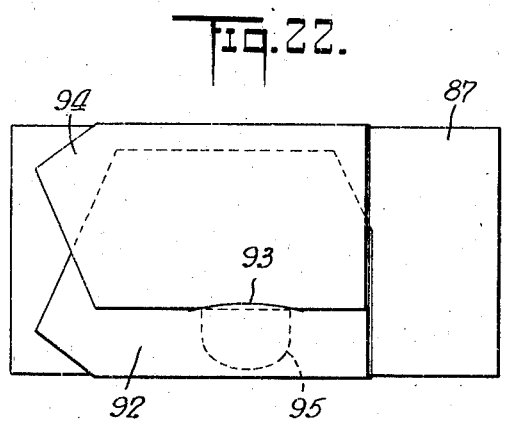
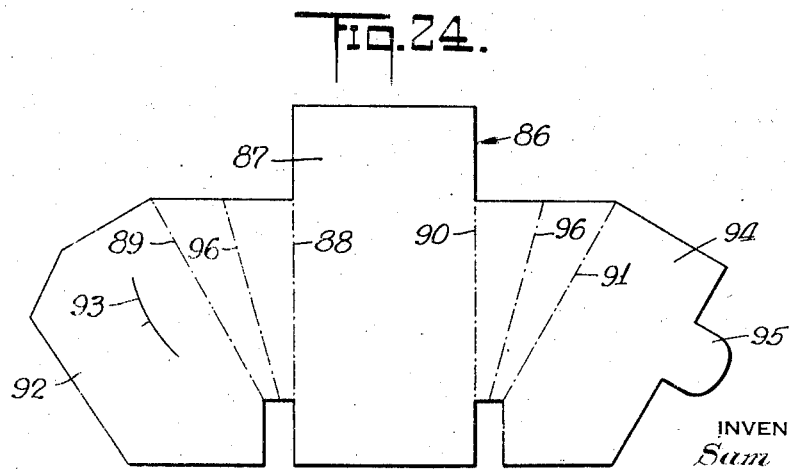
INVENTOR
Sam Gold
BY
ATTORNEYS July 20, 1943.  S. GOLD  2,324,833
EDUCATIONAL AIRPLANE COCKPIT OUTFIT
Filed Oct. 30, 1942   6 Sheets-Sheet 6
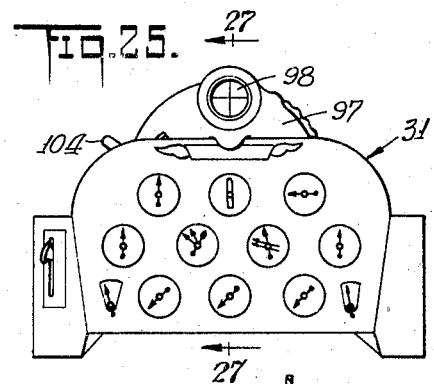
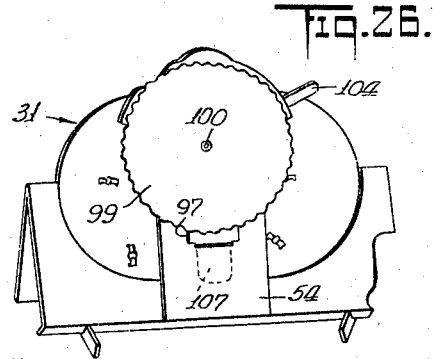
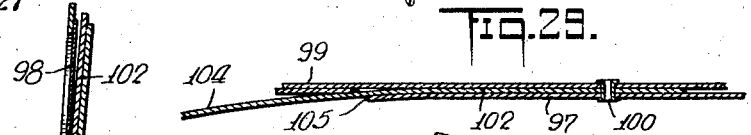
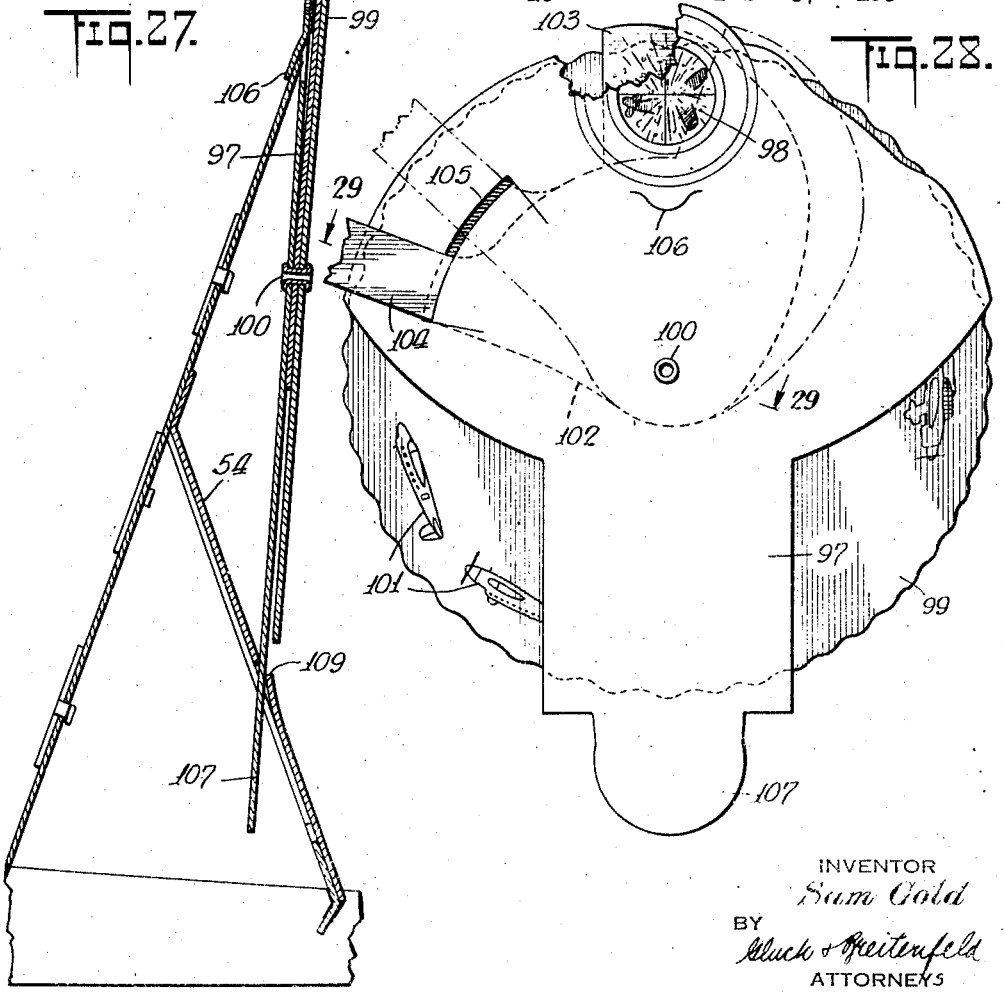
INVENTOR
Sam Gold
BY
ATTORNEYS Patented July 20, 1943

2,324,833

UNITED STATES PATENT OFFICE 2,324,833

EDUCATIONAL AIRPLANE-COCKPIT OUTFIT

Sam Gold, Chicago, Ill., assignor to Einson-Freeman Co., Inc., Long Island City, N. Y., a corporation of Delaware Application October 30, 1942, Serial No. 463,955

13 Claims. (Cl. 35—12)

My present invention relates generally to cardboard structures, and has particular reference to certain collapsible or knockdown structures which constitute elements of an educational outfit.

Coordinately, my invention relates to an amusement device, also composed of cardboard, which may be employed, if desired, as an adjunct of said educational device.

A general object of my invention is to provide, in the form of relatively inexpensive cardboard structures, a highly effective means for simulating certain important parts of an actual airplane cockpit, and the relationships of such parts to one another, the structures being primarily intended for conjoint use and being of such relative sizes that a student will be enabled to experience some of the basic problems confronting an actual flier.

More particularly, the present educational outfit comprises structures which simulate, respectively, the instrument-panel, the wheel-control, and the rudder-pedals of an airplane cockpit; and it is contemplated that a student sitting before the instrument-panel with his hands on the wheel-control and his feet on the pedals will thus be subjected to conditions simulating those which obtain in an actual cockpit. This experience, augmented by suitable instruction, either in a classroom or otherwise, enables the student not only to acquire a better understanding of the controls and instruments involved in flying an airplane, but also to experience and develop a familiarity with the coordination between instrument readings and hand and foot movements which is called for under varying conditions of actual flight.

In accordance with my invention, the structure which simulates the instrument-panel includes a representation of the more important instrument dials customarily present on the instrument-panel of an actual airplane cockpit, and with each such dial, there is provided at least one pointer which may be manually controlled and adjusted into different settings. At the same time, the wheel-control is so constructed and designed that a wheel element mounted at the upper end of a post portion may be grasped and rotated by the student, while the post portion itself may be subjected to forward-and-back movements, thus imparting to the student a realistic and highly effective "feel" of the corresponding manipulations that would have to be made in an actual airplane. Similarly, the rudder-pedals are so designed that foot pressure may be realistically applied against a yieldable resilience, thus simulating the "feel" of actual rudder-pedals.

Quite apart from the fact that there are today insufficient actual cockpits available to permit the millions of prospective students of flying, especially beginners, to experience an actual proximity to actual flying controls, it should be remembered that even those who are ready to enter an actual cockpit can experience no real coordination between instrument readings and flying controls so long as the airplane remains on the ground, because the actual instruments are necessarily inactive under such circumstances. By means of the present educational outfit, capable of production in large quantities at relatively small expense, students are enabled at a very early stage of their training to acquire familiarity with the general aspects of an actual cockpit, and to practice and rehearse the various coordinated movements and manipulations which actual flying will ultimately require of them. Moreover, the ability to set the various dials of the present outfit at selected readings affords a highly effective means for teaching the relationship of the readings to one another, and the relationships between such readings and the various "maneuvers" which the student is performing by corresponding coordinated adjustments of the wheel-control and the rudder-pedals.

In addition to the foregoing general objects and advantages of the present invention, the several cardboard structures have numerous detailed features which are new and useful, not only from the standpoint of construction, but also from the standpoint of simplified and inexpensive manufacture.

Among these features are: a special design of the pointer elements for the instrument-panel dials whereby the use of metal or other critical materials is avoided while simplicity of manufacture and manipulation is retained; a special construction of the instrument-panel device to provide a realistic simulation of the throttle of an actual cockpit; a design of the wheel-control so that the use of metal and critical materials is avoided and so that the wheel element is nevertheless rotatable with a maximum of ease; a design of the post portion of the wheel-control to permit the desired forward-and-back movements to be effected by merely abutting it against the forward edge of a chair or the like; and a special design of the rudder-pedal structure which imparts to it the desired yieldability and resilience without requiring the use of any spring or other extraneous elements.

These and other features of the invention are coupled with innovations in design whereby each structure is composed of a minimum amount of flat cardboard material, and is readily adjustable from a completely collapsed or "knockeddown" condition to an operative set-up condition, and vice versa, the manipulations required being in each case of an extremely simple nature, and the set-up structures being of unusual staunchness and durability.

The amusement device to which my invention coordinately relates consists essentially of a cardboard blank having a transparent window which simulates a gun-sight, a rotatable disk being associated with this blank so that a series of target representations may be successively brought into registry with this window. While this device is intended purely for amusement purposes, and may be independently employed, it is so designed that it may be removably associated, if desired, with the instrument-panel of the educational outfit, the mode of attachment being of such a character that the normal utility of the educational outfit remains unimpaired. The amusement device has certain unique structural and operative features of its own and an educational value may be imparted to it by imparting to the target representations the outlines or contours of different types of airplanes, so that a familiarity with these contours may be developed. This amusement device, however, with or without any educational attributes, does not contribute, strictly speaking, to the primary objects of the invention, and does not truly constitute a part of the educational outfit hereinbefore referred to.

I achieve the foregoing general and specific objects and advantages, and such other objects and advantages as may hereinafter appear or be pointed out, in the manner illustratively exemplified in the accompanying drawings in which:

Figure 2 is a front view of the instrument-panel structure by itself;

Figure 3 is a cross-sectional view taken substantially along the line 3—3 of Figure 2;

Figure 4 is a rear view of Figure 2;

Figure 5 is a plan view of the cardboard blank entering into the construction of the instrument-panel;

Figure 6 is an enlarged cross-sectional view taken substantially along the line 6—6 of Figure 2;

Figure 7 is a front view of the structure detail shown in Figure 6;

Figure 8 is an enlarged front view of an illustrative dial and pointer assembly;

Figure 9 is a cross-sectional view taken substantially along the line 9—9 of Figure 8;

Figure 10 is a cross-sectional view taken substantially along the line 10—10 of Figure 8;

Figure 11 is a perspective view of the pointer element of Figures 8-10 shown by itself;

Figure 12 is a front view of another illustrative dial and pointer assembly, in which two pointers are employed;

Figure 13 is a cross-sectional view taken substantially along the line 13—13 of Figure 12;

Figure 14 is a perspective view of the second pointer element of Figure 12 shown by itself;

Figure 15 is a front elevational view of the wheel-control by itself, in set-up condition, with a portion broken away to reveal the construction beneath;

Figure 16 is a side view of the device of Figure 15;

Figure 17 is an enlarged cross-sectional view taken substantially along the line 17—17 of Figure 15;

Figure 18 is a cross-sectional view taken substantially along the line 18—18 of Figure 16;

Figure 19 is a view of the wheel-control in collapsed condition;

Figure 20 is a perspective view of a rudder-pedal structure;

Figure 21 is a cross-sectional view taken substantially along the line 21—21 of Figure 20;

Figure 22 is a bottom view of the rudder-pedal in set-up condition;

Figure 23 is a side view of the same;

Figure 24 is a plan view of the blank of which the rudder-pedal is composed;

Figure 25 is a front view of the instrument-panel structure with the amusement device associated therewith;

Figure 26 is a rear perspective view of the assembly of Figure 25;

Figure 27 is an enlarged cross-sectional view taken substantially along the line 27—27 of Figure 25;

Figure 28 is an enlarged front view of the amusement device by itself, a part being broken away to reveal the structure beneath; and Figure 29 is a cross-sectional view taken substantially along the line 29—29 of Figure 28.

Figure 1:
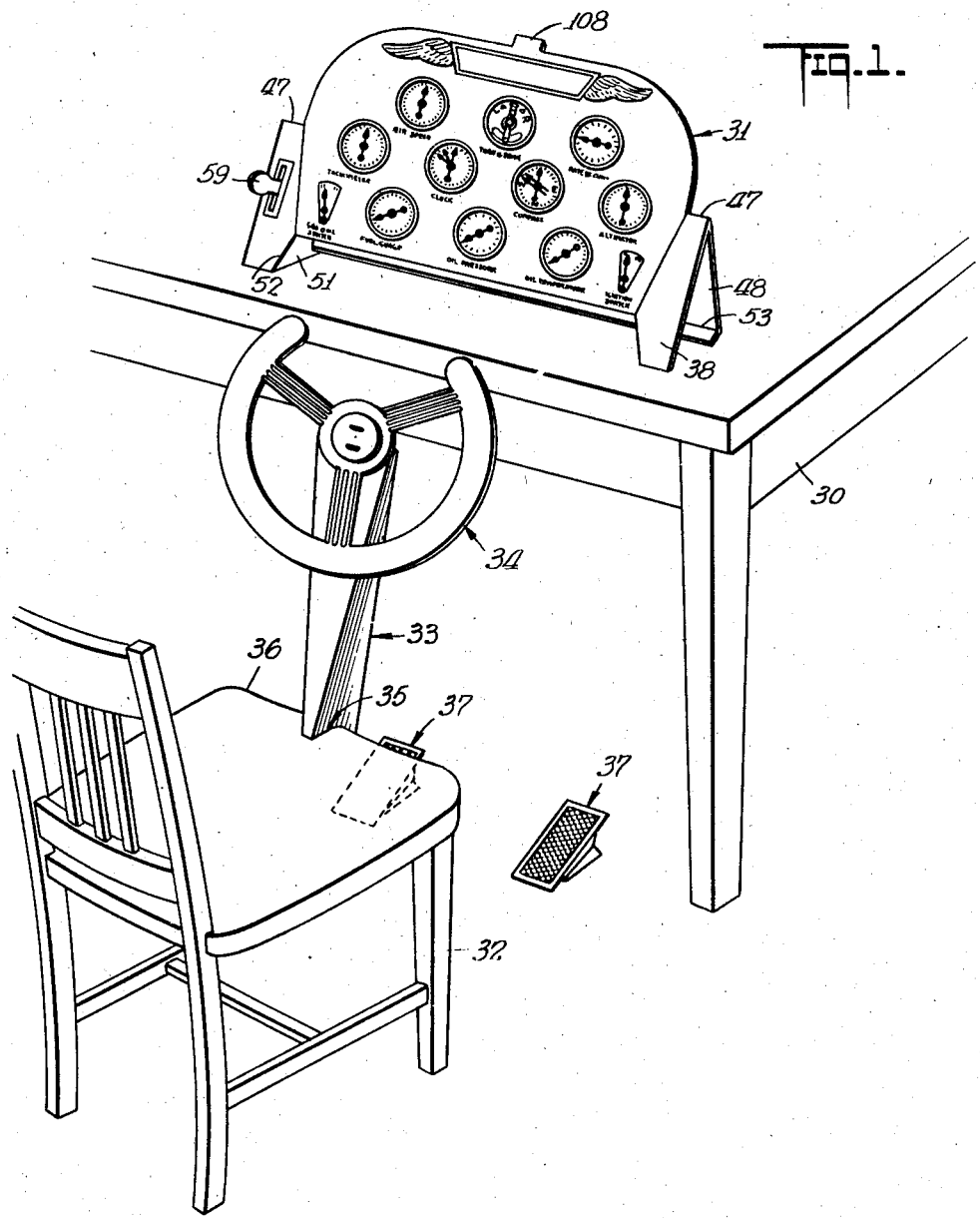
Figure 1 is a perspective view of the elements of the present educational outfit shown in set-up condition and in cooperative relationship.

It is contemplated that the structures entering into the educational outfit shall be utilized in the illustrative manner shown in Figure 1. In this figure, I have shown a table 30 upon which the instrument-panel structure 31 may be set up as indicated, so that the front of it is approximately at the level of the eyes of a student who would seat himself upon the chair 32. The wheel-control structure comprises a post portion 33 and a wheel element 34, the post portion having a specially shaped lower end 35 adapted to abut against the forward edge 36 of the chair 32. The rudder-pedal structures 37 would be set up on the floor in the approximate relationships shown.

Reference is now directed to Figures 2-14, in which certain details of the instrument-panel structure are more fully illustrated.

This structure is composed of a main element 38 formed of flat cardboard stock and bearing on its front face certain embellishments simulating the appearance of an actual instrument-panel. These embellishments include a simulation of certain of the instrument dials customarily present on the instrument-panel of an actual airplane cockpit. In association with each dial representation I provide one or more pointer elements (to be described more fully hereinafter), depending upon the nature of the dial. For example, I have shown a dial 39 representing "rate of climb" in association with which there is a single pointer element 40; I have shown a "compass" dial 41 in connection with which there are two pointer elements 42 and 43; and I have shown a "clock" dial 44 in connection with which there are three pointer elements representing, respectively, the hour hand, the minute hand, and the second hand. Similarly, a dial 45 simulating the usual "turn and bank" indicator is provided with two pointer elements, one of which (in an actual instrument) swings toward either of the designations "L" or "R" as the airplane turns, while the other indicates by its position whether the plane has been banked to a correct degree. The other instruments represented on the present structure have been provided with only one pointer element each, but it will be understood that my invention is not restricted to any particular instrument or group of instruments, and that the showing made in the present drawings is purely illustrative in character.

The main element 38 is associated with a cardboard prop which is arranged behind it and is adapted to support it in a substantially upright position on the table 30 or upon a similar supporting surface. This prop may be of any suitable character, so far as its supporting functions are concerned, but it must be designed in such a way that it will not interfere with the pointer elements.

The preferred type of structure consists essentially of a single flat cardboard blank as shown in Figure 5, this blank being cut along the line 46 and scored along the spaced parallel lines 47 whereby the main element 38 is integrally associated with the prop portion 48. When the structure is to be set up, the prop portion 48 is folded in a rearward direction along the lines 47. At its free edge, the portion 48 is provided with notches 49 which are adapted to interengage with complementary notches 50 provided on bracing tabs 51. These tabs are integral portions of the original blank, are shaped substantially as shown in Figure 5, and are adapted to be swung rearwardly along hinge lines 52 when the structure is to be set up. If desired, a fold line 53 may be provided along the lower edge of the prop portion 48 to facilitate the interengagement of the parts.

For strengthening purposes, it is desirable to provide an additional prop portion 54 which may consist of a separate cardboard element having a hinged attachment panel 55 at its upper edge. This panel may be secured, by adhesive means or otherwise, to the mid-portion of the rear face of the main element 38, while the lower marginal portion of the element 54 is secured, by adhesive means or otherwise, to the prop portion 48.

In collapsing the structure, it is not necessary that the prop portion 48 be brought back into the relationship shown in Figure 5. A collapsing of the structure into a substantially flat condition is permitted by merely releasing the notches 49 and 50, returning the flaps 51 to the plane of the element 38, and swinging the prop portion downwardly so that it will lie behind the lower part of the main element 38.

One of the features of my invention lies in the provision of an element intended to simulate the throttle of an actual airplane cockpit. This I prefer to accomplish by cutting the prop 48 along the line 56 (see Figure 5) and by providing fold lines 57 and 58 at right angles to each other. This defines an integral portion 59 which, when folded along the line 58, assumes a position at right angles to both the prop portion 48 and the main element 38. A slot 60 is provided in the element 38 at a suitable position so that the portion 59 may be adjusted lengthwise in the slot 60 to simulate the movements to which the throttle of an actual airplane might be subjected.

The slot 60 is so positioned that the projecting portion 59 will bear against one side wall of the slot with sufficient friction to remain in any desired position to which it is set.

Needless to say, the portion 59 is first withdrawn rearwardly from the slot 60 before the structure is collapsed or knocked-down.

In Figures 8-11, I have illustrated the details of one of the dial assemblies, and I have chosen, by way of example, the dial 39 representing "rate of climb."

At the proper point, a circular opening 61 is provided in the element 38. In the illustrated embodiment, the dial representation 39 is circular in character, and the opening 61 is arranged at the center. Fitting into association with this opening, in a removable manner, is the cardboard pointer element 40 which is shown most clearly in Figures 8-11. This element may be composed of a single blank of cardboard shaped to provide a pointer portion 62 and wings or ears 63. Each of these ears is hinged to the pointer portion along a line 64 so that these ears may be folded rearwardly into substantially parallel relationship. When thus adjusted, the two ears 63 are passed rearwardly through the opening 61. The ears 63 are then deflected toward their original extended positions as shown in Figure 10, and this serves to retain the pointer element in association with the "instrument-panel." To prevent inadvertent forward withdrawal of the pointer element, I prefer to provide lateral extensions 65 at the rear ends of the ears 63.

The width of each ear is so chosen, with respect to the distance between the hinge lines 64, that when the pointer element is in position, the side edges of the ears 63 will bear frictionally against the wall of the opening 61 (see Figure 8). This frictional engagement allows the pointer element to be freely adjusted into any selected position (to represent different "readings" of the instrument), and to retain this setting in any desired position.

In Figures 12-14 I have illustrated a dial assembly in which two pointer elements are employed. I have chosen for this purpose to illustrate the detail structure of the illustrative dial 41 representing a "compass."

In an actual compass there is a pointer which moves automatically in accordance with the direction in which the airplane is flying, and there is a second pointer which is manually controlled to enable the operator to "set his course," whereby the relationship between the movable pointer and the fixed pointer will constantly indicate the accuracy with which he is or is not pursuing that course.

To simulate this actual set of conditions, the present structure provides the two pointer elements 42 and 43, the former being intended to simulate the manually adjustable pointer element.

As in the previously-described dial, a circular opening 66 is provided in the main element 38 at the proper selected point. I have chosen to show the dial 41 of circular shape, and the opening 66 as provided at the center. The pointer element 43 may be constructed in exactly the same way as the pointer element 40 shown in Figures 8-11, and it is associated with the "Instrument-panel" in exactly the same way. The pointer element 42, however, is of slightly different construction and is shown most clearly in Figure 14. This element consists of a blank of cardboard shaped to provide a pointer portion 66 and a central hub portion 67. The portion 67 has an opening 68 which is identical in size with the opening 66.

When the parts are assembled, the pointer element 42 is laid beneath the pointer element 43, with the opening 68 in registry with the opening 66; and the ears 69 of the pointer element 43 are then passed rearwardly through both of these registering openings. The frictional engagement of the ears 69 with the walls of the openings 66 and 68, coupled with the additional friction imposed by the overlying pointer element 43, is sufficient to permit either of the pointer elements to be adjusted into any selected position with the dial and to retain such "setting."

Where three pointer elements are desired, as for example in connection with the "clock" dial 44, the same procedure is followed. That is, each of the underlying pointer elements is constructed substantially as shown in Figure 14, while the outermost pointer element is constructed substantially as shown in Figure 11.

It will be understood that, for each dial representation on the "instrument-panel," in connection with which one or more pointers is to be employed, a suitable opening is provided in the main element 30, as illustratively exemplified by the openings 61 and 66, in a proper position with respect to the embellishment to be provided on the front face of this element. The dials need not necessarily be circular in shape.

It will be observed that the prop portion of the structure is of such a character that it does not interfere with the adjustment of the pointer elements when the device is used, and that the pointer elements are so associated with the structure that a withdrawal or removal is not necessary to permit the structure to be collapsed.

In Figures 15–19 I have illustrated the structural details of a preferred form of wheel-control.

The post portion of this structure comprises an element 70 formed of flat cardboard stock which is foldable into a tubular condition when it is to be set up. With this object in view, the element 70 is provided with score lines 71 so that when the portions 72 are folded in a rearward direction they will constitute side walls of the tubular structure, as indicated most clearly in Figure 18. The rear wall 73 may be of reduced dimensions, and it is preferably provided with a hinged attachment flap 74, a suitable slot 75 being provided to receive an attachment tab 76 formed on the opposite wall 72.

The front wall 77 of the post portion 33 is preferably of circular contour at its upper end to facilitate the attachment of the wheel element 34.

The wheel element 34 may be formed of a single blank of flat cardboard suitably shaped to define a peripheral grasping portion 78, spokes 79, and a hub portion 80. The portion 80 is provided with a relatively large opening at its center.

Attached to the front wall 77 of the post portion 33 is a flat circular hub element 81 adapted to fit snugly into the aperture formed in the hub portion 80 of the wheel element. The hub element 81 may be attached to the wall 77 in any desired manner and serves as a strong and efficient support for rotatably mounting the wheel element 34 to the post portion 33.

For the purpose of holding the wheel element 34 in position, a retaining element is preferably provided in the form of a flat disk 82, slightly larger than the hub element 81. The retaining element 82 is secured over the hub element 81, and a convenient procedure lies in the employment of staples 83 or equivalent fastening means which pass through the wall 77, and through the elements 81 and 82, thereby holding all of these parts in firm superposed relationship. This leaves the wheel element 34 in secure sandwiched relationship between the wall 77 and the retaining element 82, yet freely rotatable on the hub element 81.

It will be observed that the lower end of the post portion 33 is of special configuration. This configuration is brought about by providing a concaved lower edge 84 on each of the side walls 72, this being preferably accomplished by an elongation to each side wall at the rear, as indicated at 85. As a result, when the structure is set up, the lower end 35 of the post portion is adapted to abut against the forward edge of a chair or the like to permit forward-and-back movements of the post portion in simulation of the corresponding movements to which an actual wheel-control may be subjected. So long as the abutment (against the chair edge) of both of the walls 72 is maintained, lateral movements of the post portion are prevented. As a result, the student seated in the chair with the post portion between his knees and with the wheel-element in his hands is enabled to perform and practice the various coordinated movements to which an actual wheel-control is subjected during the process of flight.

In Figures 20–24 I have illustrated the details of a preferred construction of rudder-pedal structures.

Each rudder-pedal is preferably composed of a single blank of flat cardboard stock, an illustration of this element being shown at 86 in Figure 24. A central substantially rectangular panel 87 is provided with laterally extending portions. Between the hinge lines 88 and 89 a panel is formed which is substantially triangular in shape. A similar panel is formed between the hinge lines 90 and 91 on the opposite side of the main panel 87. Secured to the hinge line 89 is a part 92 having a slot 93 therein, and secured to the hinge line 91 is a part 94 provided with an attachment tab 95.

By folding the parts rearwardly along the hinge lines 88—91, the parts 92 and 94 are brought into superposed relationship beneath the main panel 87, and when the tab 95 is engaged with the slot 93, a tubular structure is formed having a bottom portion adapted to rest on the floor, and an elevated foot-receiving portion. The supporting portion is formed conjointly by the superposed parts 92 and 94. The foot-receiving portion is constituted of the main panel 87. Between these portions are triangular side connecting portions.

The resultant structure is of a character in which the foot-receiving portion and supporting portion converge forwardly when the structure is set up and ready for use, as shown most clearly in Figures 1 and 20.

To permit the foot-receiving portion to be depressed, to simulate the action of an actual rudder-pedal, each of the side connecting portions is constructed in a collapsible manner, and this is preferably accomplished by providing each side connecting portion with at least one longitudinal pleat whose wings move closer together or further apart as the portion 87 is depressed or released. I have illustratively shown a construction in which each of the side connecting portions is provided with a middle fold line 96 thereby forming an inwardly turned pleat. The cardboard at the hinge lines 88—91 and along the folds 96 is caused to have a sufficient inherent resilience to yieldably resist a collapse of the side connecting portions when the foot-receiving portion 87 is depressed. Accordingly, a structure is provided which simulates, in a unique manner, the yieldable resistance which an actual rudder-pedal presents, and this desirable result is accomplished by an extremely simple cardboard structure which is totally devoid of any extraneous springs or other parts.

In dot-and-dash lines in Figures 21 and 23, I have indicated the relative positions of the parts when the rudder-pedal is depressed. When the pressure is released, the inherent resilience of the cardboard restores the rudder-pedal to its normal position.

In Figures 25–29 I have shown the details of the amusement device which may be used to advantage as an adjunct to the educational outfit.

A blank of flat cardboard 97 (see Figure 28) is provided with a transparent window 98, preferably adjacent to the upper edge of the blank 97. This window may be provided by forming a suitable aperture in the blank 97 and by mounting a flat element of transparent material behind it. This material may be composed of Cellophane or its equivalent. The opening in the blank is preferably circular, and the Cellophane or other transparent element is preferably provided with markings simulating the cross-hairs or other marks on an actual gun sight.

Arranged behind the blank 97 and rotatably secured thereto is a disk 99 which is also preferably formed of a blank of cardboard. The rotatable association of the parts may be accomplished in any desired manner and I have illustratively shown an eyelet 100 extending through the superposed blanks 97 and 99 and serving as a pivot axis.

On the disk 99 I provide a series of representations of targets which are so arranged with respect to the pivot axis and with respect to the transparent window that they will register successively with the window when the disk 99 is rotated. I have illustratively shown the "targets" as representations 101 of various types of airplanes, these representations being preferably of such size that only one complete target may occupy the space behind the transparent window at any instant of time. These targets are also preferably spaced in such a manner that occasionally there will be no target at all within the confines of the transparent window.

In accordance with my invention, a flat element 102 is sandwiched between the element 97 and the disk 99 and comprises a signal portion 103 which bears an indicia that a target has been hit. The element 102 is so mounted that it may be moved into and out of a position in which the signal portion 103 registers with the window 98. Preferably, the element 102 is mounted for pivotal movements on the axis 100. It is provided with an accessible trigger portion 104 by means of which the movements of the element 102 may be controlled. The portion 104 preferably assumes the form of an extended handle, and an arcuate slot 105 is preferably provided in the element 97 to permit the handle 104 to project into an accessible position.

The amusement device is so constructed that the disk 99 is freely rotatable so that it may be set into rapid rotation. With the signal portion 103 adjusted into a concealed or inoperative position, it is contemplated that the disk 99 will be spun so that one or another of the targets 101 (or perhaps no target at all) will appear behind the window 98 when the rotation ceases. Amusement can be had by thus affording or denying to the user an opportunity to "sight" a target, perhaps requiring him to identify such target if it appears behind the window. Further amusement is afforded by enabling the user who has sighted (and possibly identified) a target to manipulate the handle 104 so as to bring into view a representation of a target that has been hit.

While the amusement device is thus obviously an independent structure which may be independently employed, I have provided a means whereby it may be separably secured to the "instrument-panel" structure in a manner which will not otherwise interfere with the educational outfit as a whole. This is preferably accomplished by providing a slot 106 in the blank 97, directly beneath the window 98, and by providing a tab 107 at the lower end of the element 97. The slot 106 is adapted to fit over a tab 108 (see Figure 1) provided on the upper edge of the "instrument-panel" 31, and the tab 107 is adapted to project through a slot 109 formed in the prop portion 54 (see Figures 4, 26 and 27). This secures the windowed blank 97 of the amusement device to the prop of the structure 31 so that the blank is adequately spaced rearwardly from the pivot portions of the pointer elements of the "instrument-panel," and so that the "gun-sight" window 98 is nevertheless adjacent to the upper edge of the "instrument-panel." In this way, the manipulation of the pointer elements is not interfered with.

The "instrument-panel" structure shown in Figures 25–29 is identical with the structure hereinbefore described and illustrated in connection with Figures 1–14. Accordingly, the same reference numerals have been applied thereto.

In general, it will be understood that the details herein described and illustrated may be modified by those skilled in the art without departing from the spirit and scope of the invention as expressed in the appended claims. It is therefore intended that these details be interpreted as illustrative and not in a limiting sense.

Having thus described my invention, and illustrated its use, what I claim as new and desire to secure by Letters Patent is:

1. A knock-down cardboard structure which, when set up, simulates in position the instrument-panel of an airplane cockpit, comprising a main element formed of flat cardboard stock and bearing on its front face indicia forming simulations of instrument dials of an actual instrument-panel, and a cardboard prop behind said element and adapted to support it in a substantially upright position upon a table or similar supporting surface.

2. A knock-down cardboard structure as set forth in claim 1, said element having a slot therein, and said prop being provided with an elongated lever portion attached at one end to the prop and adapted to project forwardly through said slot, said projecting portion simulating an actual throttle and being movable lengthwise of said slot to simulate the movements to which an actual throttle may be subjected.

3. A knock-down cardboard structure as set forth in claim 1, said element having a slot therein, and said prop being provided with an elongated lever portion attached at one end to the prop and adapted to project forwardly through said slot, said projecting portion simulating an actual throttle and being movable lengthwise of said slot to simulate the movements to which an actual throttle may be subjected, the projecting portion of said throttle simulation bearing against one side wall of the slot with sufficient friction to be held in any adjusted position.

4. A knock-down cardboard structure as set forth in claim 1, and at least one cardboard pointer element rotatably mounted in association with each dial.

5. In a cardboard structure of the character described, a flat cardboard element bearing on its front face a simulation of at least one of the instrument dials customarily present on the instrument-panel of an actual airplane cockpit, said element having a circular opening at the operative center of said dial, and at least one cardboard pointer mounted in said opening for rotative movements relative to said dial, said pointer comprising a cardboard blank cut and folded to provide a pair of rearwardly-projecting ears adapted to extend through said opening and to bear frictionally against the wall of said opening.

6. In a cardboard structure of the character described, a flat cardboard element bearing on its front face a simulation of at least one of the instrument dials customarily present on the instrument-panel of an actual airplane cockpit, said element having a circular opening at the operative center of said dial, and at least one cardboard pointer mounted in said opening for rotative movements relative to said dial, said pointer comprising a cardboard blank cut and folded to provide a pair of rearwardly-projecting ears adapted to extend through said opening and to bear frictionally against the wall of said opening, and lateral extensions at the rear ends of said ears to prevent inadvertent forward withdrawal of said ears through said opening.

7. In a cardboard structure of the character described, a flat cardboard element bearing on its front face a simulation of at least one of the instrument dials customarily present on the instrument-panel of an actual airplane cockpit, said element having a circular opening at the operative center of said dial, and at least two cardboard pointers mounted in said element for independent rotative movements relative to said dial, the underlying pointer having a hub portion with an opening which is of the same size as the circular opening in said element, the outermost pointer comprising a cardboard blank cut and folded to provide a pair of rearwardly-projecting ears adapted to extend through said openings and to bear frictionally against the walls of said openings.

8. An amusement device comprising a blank of flat cardboard provided with a transparent window simulating a gun-sight, a disk arranged behind said blank and rotatably secured thereto, said disk bearing a series of representations of targets so arranged that they register successively with said window when the disk is rotated, and a flat element sandwiched between said blank and disk and comprising a signal portion which bears an indicia that a target has been hit, said element being mounted for movement into and out of a position in which said signal portion registers with said window.

9. An amusement device as set forth in claim 8, said element being provided with an accessible trigger portion by means of which the movements of said signal portion may be controlled.

10. In a knock-down cardboard structure of the character described, the combination with an educational device simulating the instrument-panel of an airplane cockpit, of an amusement device simulating a gun-sight; said educational device comprising a flat cardboard element bearing on its front face a simulation of certain instrument dials customarily present on an actual instrument-panel, pointer elements movably associated with certain of said dials and having pivot portions which project through to the rear face of said element, and a prop behind said element and adapted to support it in a substantially upright position upon a table or similar supporting surface; said amusement device comprising a blank of flat cardboard provided with a transparent window simulating a gun-sight, and a disk arranged behind said blank and rotatably secured thereto, said disk bearing a series of representations of targets so arranged that they register successively with said window when the disk is rotated; and means for separably securing the windowed blank of said amusement device to said prop so that said blank is spaced rearwardly from the pivot portions of said pointer elements and so that the gun-sight window is nevertheless adjacent to the upper edge of said instrument-panel element.

11. An educational outfit comprising a set of cardboard structures, simulating, respectively, the wheel-control and the instrument panel of an airplane cockpit, said instrument panel having indicia thereon forming simulations of instrument dials, means for supporting the instrument panel structure in an upright position on a table surface, and a supporting post for the wheel control structure having a concaved lower end shaped to rest upon the seat of a chair at the forward edge thereof thereby providing for rocking action of said wheel control structure about said forward edge of the chair while a person is seated upon said chair facing the instrument panel structure.

12. An educational outfit comprising a set of collapsible cardboard structures simulating, respectively, the instrument-panel, the wheel-control, and the rudder-pedals of an airplane cockpit, said structures being of such relative sizes that a student sitting before the instrument-panel with his hands on the wheel-control and his feet on the pedals will be subjected to condition simulating some of those which obtain in an actual cockpit; said instrument-panel structure comprising a main element formed of flat cardboard stock and bearing on its front face indicia forming simulations of instrument dials of an actual instrument-panel, and a cardboard prop behind said element and adapted to support it in a substantially upright position upon a table or similar supporting surface.

13. An educational outfit comprising a set of collapsible cardboard structures simulating, respectively, the instrument-panel, the wheel-control, and the rudder-pedals of an airplane cockpit, said structures being of such relative sizes that a student sitting before the instrument-panel with his hands on the wheel-control and his feet on the pedals will be subjected to conditions simulating some of those which obtain in an actual cockpit; said instrument-panel structure comprising a main element formed of flat cardboard stock and bearing on its front face indicia forming simulations of instrument dials of an actual instrument-panel, and a cardboard prop behind said element and adapted to support it in a substantially upright position upon a table or similar supporting surface; said wheel-control comprising an upright post portion and a wheel portion at the upper end of said post portion, said post portion having its lower end shaped to abut against the forward edge of a chair or the like to permit rocking action of said wheel-control structure about said forward edge of the chair while the student is seated upon said chair facing the instrument-panel structure.

SAM GOLD.